United States Patent

Liesenhoff et al.

[11] Patent Number: 5,819,788
[45] Date of Patent: Oct. 13, 1998

[54] BASE-PLATE DISTRIBUTING VALVE

[75] Inventors: Thomas Liesenhoff; Jens-Olaf Hartig; Raimund Buschmann; Diane Göttling, all of Hanover; Helmut Göttling, Isernhagen; Rudolf Möller, Gehrden; Peter Müller, Hanover; Gerhard Scharnowski, Gehrden, all of Germany

[73] Assignee: Mannesmann Aktiengesellschaft, Düsseldorf, Germany

[21] Appl. No.: 728,904

[22] Filed: Oct. 11, 1996

Related U.S. Application Data

[63] Continuation of Ser. No. 417,733, Apr. 5, 1995, abandoned.

[30] Foreign Application Priority Data

Apr. 6, 1994 [DE] Germany ................. 44 12 247.0

[51] Int. Cl.$^6$ .................................................... F16K 27/04
[52] U.S. Cl. .................................... 137/454.2; 137/625
[58] Field of Search ........................ 137/454.2, 454.6, 137/625

[56] References Cited

U.S. PATENT DOCUMENTS 3,347,260 10/1967 Lewis et al. ................. 137/454.6 X
4,437,486 3/1984 Bianchi ........................ 137/454.2 X

FOREIGN PATENT DOCUMENTS 2048525 4/1972 Germany .
2518465 11/1976 Germany ..................... 137/454.2
4111890 10/1992 Germany .
4143274 8/1993 Germany .

Primary Examiner—Stephen M. Hepperle
Attorney, Agent, or Firm—Cohen, Pontani, Lieberman & Pavane

[57] ABSTRACT

A base-plate distributing valve comprised of a valve body, a base-plate element and a valve element slidably disposed within a longitudinal bore of the valve body. Pressure medium line ports and pressure medium lines are contained within the valve body and the base-plate element. The base-plate element contains an opening into which the part of the valve body which contains the valve element may be inserted. Within the valve element are valves. A drive element controls the valve element which shifts position the position of the valves within the longitudinal bore of the valve body to permit alignment of the pressure medium lines for flow therethrough. Accordingly, when the valve body is inserted into the base-plate element in a pressure-medium-tight seal, a substantially straight-lined flow of a medium through the base-plate element at a high flow rate is achieved.

9 Claims, 2 Drawing Sheets

BASE-PLATE DISTRIBUTING VALVE

The present application is a Continuation of U.S. Ser. No. 08/417,733, filed Apr. 5, 1995 now abandoned.

BACKGROUND OF THE INVENTION

1. Field of the Invention

The present invention is directed to a base-plate distributing valve having a valve body in which at least one valve element connects between pressure medium line ports, and further, having a base-plate element which contains pressure medium lines and with which the distributing valve can be brought into a nearly total pressure-medium-tight seal with the pressure medium ports.

2. Description of the Prior Art

Base-plate distributing valves are known and in widespread use. However, prior art structures and arrangements have suffered from a variety of drawbacks and deficiencies.

It is well known that in base-plate distributing valves, each individual valve body has a base-plate element associated with it. In these known designs, the base-plate elements are generally provided with the respective pressure medium channels and have corresponding ports on the surface that are to be brought into contact with the distributing valve. Furthermore, in these known arrangements, the base-plate elements themselves can be lined up in any desired manner. In the known base-plate distributing valves, routing of the pressure medium lines within the base-plate elements is standardized. Thus, there are designs in which the base-plates have only three pressure medium ports, generally connoted S, P and R. P being the pressure medium supply port, and R and S being ventilation lines. In embodiments of the known prior art distributing valves which contain inline valves, working lines, generally connoted as A and B, run directly out from the valves on "connection plates." In the known base-plate valves, the working lines A and B also run through the base-plate element, along with the aforementioned ports S, P and R.

The distributing valves which contain inline valves also exist without connection plates. In embodiments without connection plates, all of the pressure medium ports or pressure medium lines run individually, i.e., without a base-plate. The advantage of inline valves without base-plates is that a greater flow of pressure medium is achieved when the connecting lines run out directly. In contrast, all of the pressure medium lines in the base-plate valve, as well as the working lines, are run to the outside via a lateral surface of the valve body. The base-plate element also has the respective pressure medium ports on an outer surface, namely, on that outer surface which is to be brought into contact with the valve. As a result, the pressure medium connections within the base-plate elements, especially the working lines, are sharply turned. The sharp turns of the working lines impede the flow of pressure medium to a considerable extent. Until now, attempts to run the pressure medium lines in a straight line in base-plate valves have been unsuccessful. Unlike inline valves in which the pressure medium lines run in a straight line, all the pressure medium lines in base-plate valves, are run within the base-plate elements.

This problem has been addressed in the present invention, and a base-plate distributing valve has been embodied in such a way that the pressure medium lines controllable via the valve element can be run in a substantially straight line.

OBJECTS AND SUMMARY OF THE INVENTION

It is therefore an object of the present invention to provide a base-plate distributing valve which permits substantially straight-lined flow at a high rate through pressure medium lines, which are controllable via a valve element.

In accordance with the present invention, it is suggested that in a generic distributing valve, a base-plate element has an opening into which a valve body can be at least partially inserted to a point so that the valve body is in contacting relation with the corresponding base-plate element and may be fixed therein.

Another object of the invention is to permit pressure medium lines, which extend from standardized pressure medium ports in the outer wall of the base-plate element, to be directed to the valve body on one side, i.e., on one of the flanks or sides of an opening in the base-plate element, while on the opposite flank or side, without turning the pressure medium lines, working lines emerge from the valve body and enter in a substantially straight line into the corresponding flank or side of the base-plate element. The pressure medium lines and the respective emerging working pressure medium lines are arranged quasi-parallel to one another and the pressure ports are located quasi-opposite to one another. A valve element is slidably disposed within a longitudinal bore located within the valve body. The valve element is controlled by a drive element which is preferably mounted on the upper surface of the valve body. The drive element controls intermittent shifting of the valve element within the longitudinal bore of the valve body so as to permit substantially straight-lined flow through the pressure medium lines and the working pressure medium lines by lining up at least one of the pressure medium lines on one leg of the base-plate elements with at least one of the working pressure medium lines located on the opposite leg of the base-plate element. In this way, the advantage of having all of the pressure medium ports run within the base-plate element, makes it possible to achieve high flows, which would otherwise be attainable only in inline valves without base-plates.

In a further embodiment of the present invention, the base-plate element is designed with a wedge-shaped opening which is wide at its mouth and narrows as it extends into the base-plate element. The valve body contains a corresponding wedge-shaped part which is designed to permit a tight contacting fit between the valve body and the base-plate element.

The wedge-shaped configuration of the opening in the base-plate element and of the corresponding wedge-shaped part of the valve body offers considerable advantages related to sealing. On the flanks of the valve body and/or the flanks of the opening of the base-plate element are sealing elements which protrude from their respective flank surface. As the corresponding flank or side of the valve body and the base-plate element converge during insertion of the valve body into the opening in the base-plate element, the respective flanks of the valve body and of the base-plate element are brought into confronting alignment with each other. The confronting alignment of the flanks cause the protruding sealing elements to press against the opposite confronting flank surface to create a pressure-medium-tight seal.

It is to be understood that while a wedge-shaped opening is preferred, other shaped openings are possible, as for example a block-shaped opening, or a concave shaped opening.

In a further advantageous embodiment of the present invention, the valve body and the base-plate element have locking components which, when engaged, hold the valve body in place in position in the base-plate element.

DETAILED DESCRIPTION OF THE DRAWINGS

An understanding of the present invention will be facilitated by the detailed description of the presently preferred embodiment set forth herein taken together with the annexed drawings in which.

It is to be understood that the drawings are designed solely for the purposes of illustration and not as a definition of the limits of the invention, for which reference should be made to the appended claims.

DETAILED DESCRIPTION OF THE PRESENTLY PREFERRED EMBODIMENT

Figure 1:
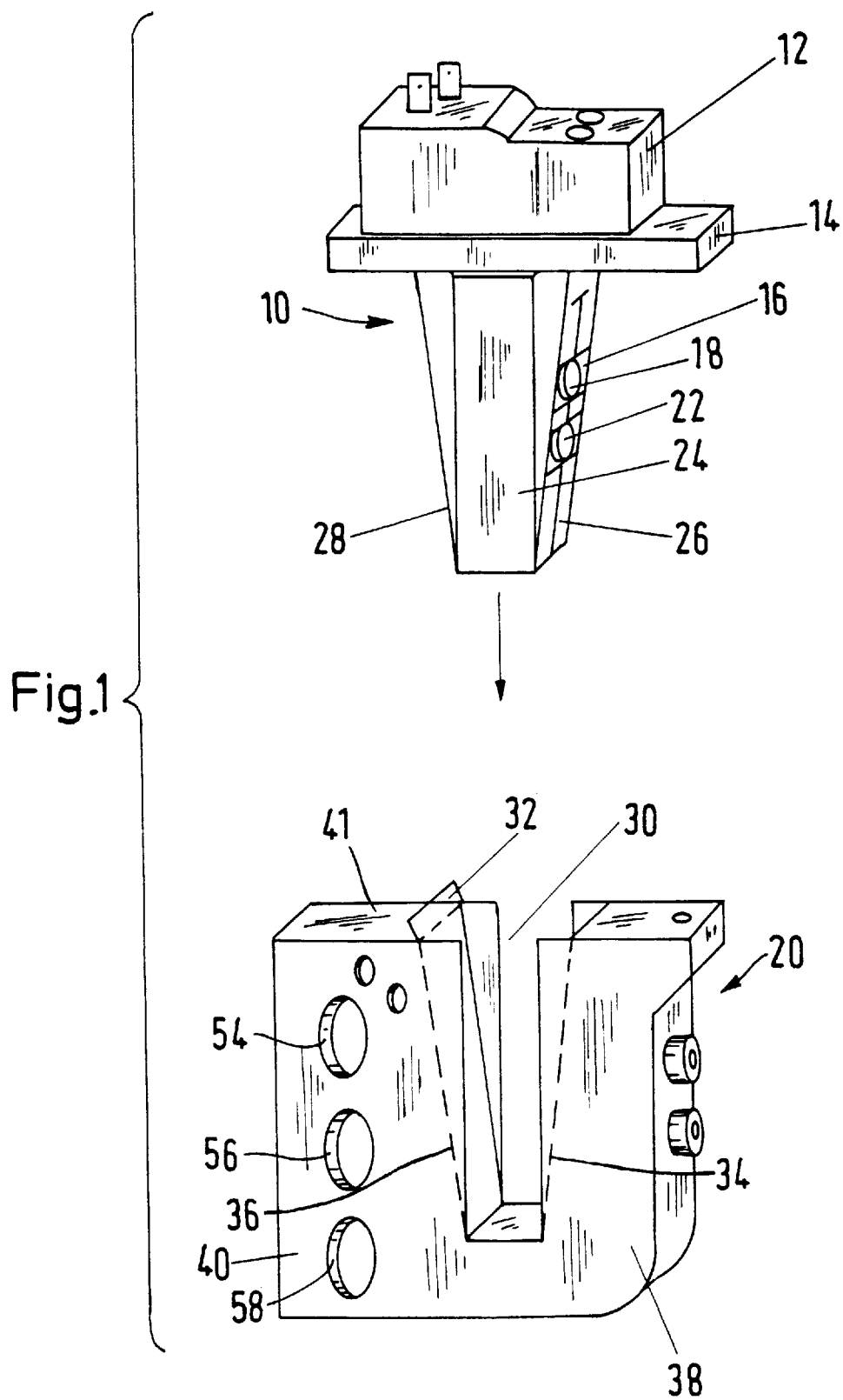
FIG. 1 is an exploded perspective view of the base-plate distributing valve in accordance with the present invention.
Figure 2:
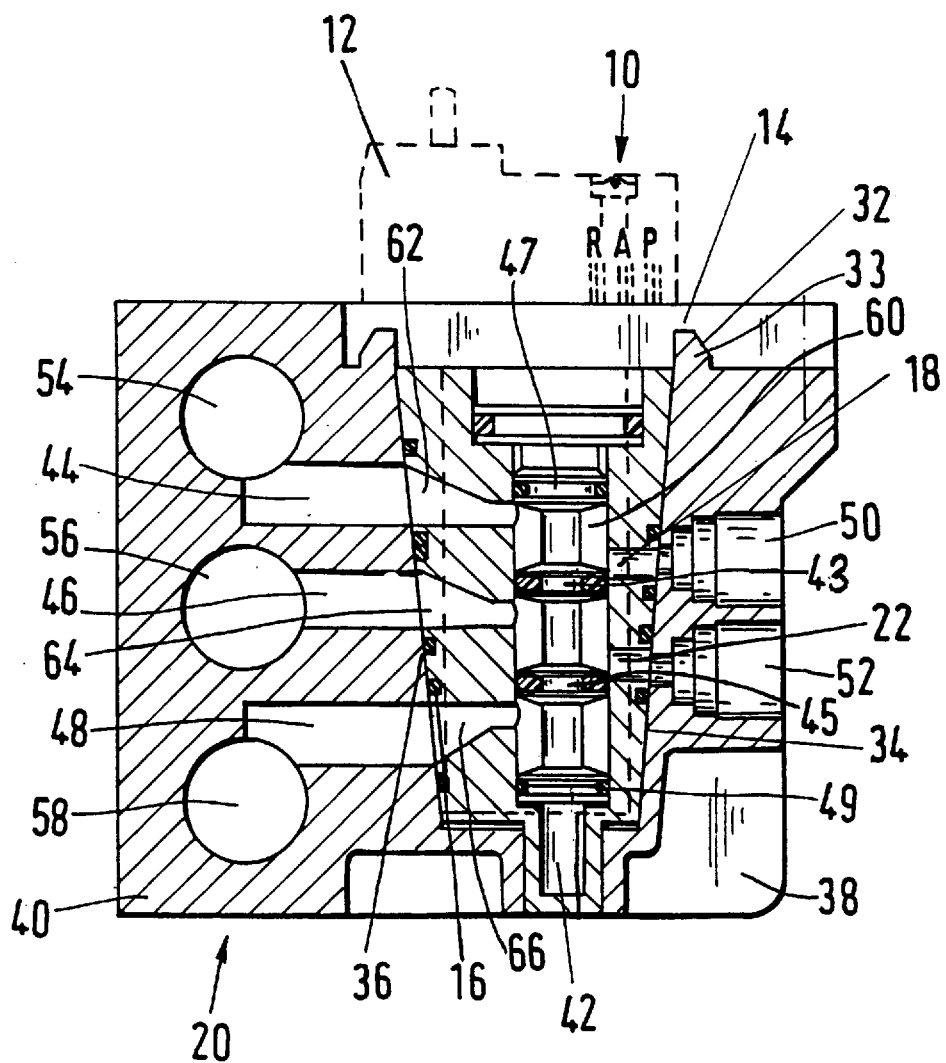
FIG. 2 is a cross-section view of the base-plate distributing valve of FIG. 1 in its assembled functional mode.

Referring now to the drawings in detail, FIG. 1 shows the invention in its disassembled mode. A base-plate element 20 includes a right leg 38, a left leg 40, and has an opening 30 which is between said right leg 38 and said left leg 38 and is defined on its sides by tapered flanks 34, 36. The opening 30 extends the outer surface 41 of the base-plate element 20 inwardly in a narrowing manner and is wedge-shaped. The opening 30 spaces right leg 38 and left leg 40 to give base-plate element 20 the appearance of a U shape. Opening 30 is configured to accommodate insertion of a corresponding wedge-shaped part of a valve body 10. As shown in FIGS. 1 and 2, base-plate element 20 contains pressure medium line ports 54, 56, 58. In communication with pressure medium line ports 54, 56, 58 are conduits in the manner of pressure medium lines 44, 46, 48 [FIG. 2], which are preferably hollowed portions of the left leg 40 of base-plate element 20. Pressure medium lines 44, 46, 48 correspond to the standardized pressure medium lines S, P, and R in the prior art. In the preferred embodiment of the invention shown in FIG. 2, pressure medium lines 44, 46, 48 extend from the left leg 40 of the base-plate element 20 and emerge on tapered side or flank 36 of the base-plate element 20. Within the right leg 38 of the base-plate element are working pressure medium lines 50, 52, which correspond to the working lines A and B of the prior art.

Valve body 10 contains a plate 14, upon which is mounted a drive element 12. The lower portion of valve body 10, on the side of the plate 14 opposite drive element 12, is configured as a wedge-shaped section 24, which narrows as it extends away from plate 14. The wedge-shaped section 24 has tapered side surfaces or flanks 26, 28 with valve body pressure medium lines 62, 64, 66 extending from the surface of tapered flank 28 to a longitudinally extending bore 60, and valve body pressure medium lines 18, 22 extending from tapered flank 26 to longitudinal bore 60. In the preferred embodiment of the invention shown in FIG. 2, valve body pressure medium lines 62, 64, 66 serve as the inputs to the valve body 10, and valve body pressure medium lines 18, 22 serve as the outputs from the valve body 10. In the assembled mode of the presently preferred embodiment of the present invention (FIG. 2), the plate 14 rests on a base-plate element 20.

In the assembled functional mode of the presently preferred embodiment of the present invention, the wedge-shaped section 24 of the valve body 10 is inserted in wedge-shaped opening 30 of the base-plate element 20. When the wedge-shaped section 24 of the valve body 10 is inserted in the opening 30 of the base-plate element 20, pressure medium lines 44, 46, 48 located which emerge from within the base-plate element on the tapered flank 36 of the left leg 40 of the base-plate element 20 align with valve body pressure medium lines 62, 64, 66 on tapered flank 28 of the valve body 10 to permit inflow into the valve body 10. For outflow from the valve body 10, valve body pressure medium lines 18, 22 on tapered flank 26 of the valve body 10 align with working pressure medium lines 50, 52 on tapered flank 34 on the right leg 38 of base-plate element 20.

As seen in FIG. 2, the valve body contains a longitudinally extending bore 60 within which a valve element 42 is slidably disposed. Valve element 42 includes two valves 43, 45 and two seals 47, 49, all fixed to valve element 42 for slidable movement therewith. The valves 43, 45 and seals 47, 49 are all in sliding sealing relation with the wall defining longitudinal bore 60.

The drive element 12, preferably an electromagnetic type, controls the movement of the valve element 42 in a longitudinal direction within the longitudinal bore 60 in the valve body 10. The drive element 12 may also be of an electromotor type or a piston drive. In the assembled functional mode of the present invention as shown in FIG. 2, the valve element 42 is driven by the drive element 12 on the valve body 10. Powered by the drive element 12, the valve 43 is caused to shift position from the position shown which permits communication of pressure medium line 44 with valve body pressure medium line 18 through bore 60 while blocking communication between valve body pressure medium line 64 and valve body pressure medium line 18. At the same time, valve 45 is positioned to permit communication of valve body pressure medium line 64 and valve body pressure medium line 22 through longitudinal bore 60 while preventing communication between valve body pressure medium line 66 and either valve body pressure medium line 18 or valve body pressure medium line 22. When valve element 42 is moved outwardly by drive element 12, valve 43 is moved to a position in which it blocks communication between valve body pressure medium line 62 and valve body pressure medium line 18 but permits communication between valve body pressure medium line 64 and valve body pressure medium line 18 through longitudinal bore 60 and when valve 45 is moved to a position in which it allows communication between valve body pressure medium line 66 and valve body pressure medium line 22 through longitudinal bore 60 while preventing communication between valve body pressure medium line 64 and valve body pressure medium line 22.

In the assembled functional mode of the present invention, the pressure medium lines 44, 46, 48 and the working pressure medium lines 50, 52 are arranged substantially parallel to one another. This substantially parallel arrangement of the conduits of the pressure medium lines 44, 46, 48 and the working pressure medium lines 50, 52 along with the valve body 10 disposed in the wedge-shaped opening 30 of the base-plate element 20 permits substantially straight-lined flow through base-plate element 20 when the valve element 42 aligns any of the pressure medium lines 44, 46, 48 with any of the working pressure medium lines 50, 52.

Sealing components 16 protrude from the flat surface of tapered flanks 26, 28 of the wedge-shaped portion 24 of the valve body 10 and/or from the tapered flanks 34, 36 of the base-plate element 20. The sealing components 16 are preferably located in the area surrounding the pressure medium lines 18, 22, 62, 64, 66 on the tapered flanks 26, 28 of the wedge-shaped section 24 of the valve body 10, or in the corresponding area on the tapered flanks 36, 38 of the wedge-shaped opening 30 of the base-plate element 20. When the wedge-shaped section 24 of the valve body 10 is inserted in the wedge-shaped opening 30 of the base-plate element 20, the confronting surfaces of the valve element 10 and the base-plate element 20 are sealed by compression of the protruding sealing components 16 between the confronting surface on the base-plate element 20 and the valve element 10 to create a pressure-medium-tight seal.

Base-plate element 20 further contains locking means 32, 33 for fixing the valve body 10 in the opening 30 of the base-plate element 20. As seen most clearly in FIG. 2, the locking means are comprised of latch-like members 32 which jut up from the upper surface of the base-plate element 20, and corresponding orifices or slots 33 in the lower surface of the plate 14 of the valve body 10. The orifices or slots 33 in the plate 14 of the valve body 10 are configured to receive the latch-like locking members 32 jutting from the base-plate element 20. The latch-like locking members 32, lockingly engage with a lug-like member (not shown) within the orifice 33 in the plate 14 of the valve body 10 to fix the valve body 10 in place in the base-plate element 20. The location of the locking components 32, 33 on the external surface of the base-plate element 20 permit easy manual fixing and unfixing of the locking connection.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

It is to be understood that the drawings are not necessarily drawn to scale, but that they are merely conceptual in nature.

What is claimed is:

1. A base-plate distributing valve comprising:

a base-plate element;

a valve body having a longitudinal bore disposed within it, said valve body having an associated drive element mounted on one of its surfaces;

a valve element slidably disposed within said longitudinal bore in said valve body and including a valve for selectively sealing off portions of said longitudinal bore;

said base-plate element having a right leg and a left leg and having an opening between said right leg and said left leg, said opening being wide at its mouth and narrower as it extends inward, said opening being configured to accommodate, at least partially, insertion of said valve body within said opening of said base-plate element;

pressure medium lines and a working pressure medium line disposed as conduits within said base-plate element for input to and output from said valve body, said pressure medium lines being directed toward said valve body, said working pressure medium line extending outwardly from said valve body and away from said valve body as an output from said valve body;

said valve being located on said valve element so that when said valve element is in one position, said valve seals off one of said pressure medium lines from said working pressure medium line while permitting communication of another of said pressure medium lines with said working pressure medium line through said longitudinal bore, and when said valve element is moved to another position, said valve seals off said other pressure medium line from said working pressure medium line while permitting communication of said one pressure medium line with said working pressure medium line through said longitudinal bore.

2. The apparatus as recited in claim 1, wherein the opening in the base-plate element is wedge-shaped and has tapered flank surfaces which define its sides, said tapered flanks being spaced apart and configured in a U shape.

3. The apparatus as recited in claim 1, wherein the valve body has a wedge-shaped section which corresponds to the wedge-shaped opening of said base-plate element for facilitating a pressure-medium-tight seal between said valve body and said base-plate element when said valve body is inserted into said opening in said base-plate element, said wedge-shaped section of said valve body having tapered flank surfaces which define its sides.

4. The apparatus as recited in claim 1, wherein the valve body and the base-plate element contain pressure medium line ports on the surfaces of said tapered flanks of said valve body and said base-plate element, said pressure medium line ports having associated pressure medium lines, said pressure medium lines extending from said pressure medium line ports as conduits within said left leg and said right leg of said base-plate element for input to and output from said valve body.

5. The apparatus as recited in claim 4, wherein said pressure medium lines in said left leg of said base-plate element are arranged substantially parallel to said working pressure medium lines in said right leg of said base-plate element.

6. The apparatus as recited in claim 1, further comprising a drive element for controllably positioning said valve element in said longitudinal bore in said valve body, said valve element being slidably moveable within said longitudinal bore of said valve body for aligning said valve element with said pressure medium lines in said right leg and said left leg of said base-plate element to permit substantially straight-lined flow therethrough.

7. The apparatus as recited in claim 1, further comprising sealing elements, and wherein said opening in said base-plate element is defined by tapered flank surfaces and the sides of said valve body are defined by tapered flank surfaces, said sealing elements protruding from the tapered flanks of said valve body and said base-plate element, said sealing components being positioned proximate the pressure medium ports on said tapered flanks of said opening of said base-plate element and proximate the pressure medium ports on said tapered flank of said valve body, said sealing components being in compressing relation with the opposite flank when said valve body is inserted in said opening of said base-plate element.

8. The apparatus as recited in claim 1, wherein said base-plate element has an outer surface, said apparatus further comprising locking means for fixing the valve body in place in the opening of the base-plate element, wherein said locking means comprises latch members which jut out from said outer surface of the base-plate element, said valve body having orifices located in said valve body, and further comprising lug-like members, one for each of said orifices, housed within said orifices for attachment with said latch member for lockingly fixing the valve body to the base-plate element.

9. The apparatus as recited in claim 8, wherein said locking means are accessible from the outside of said base-plate element to facilitate manual locking and unlocking of the locking components.

\* \* \* \* \*